United States Patent [19]
Akiyama et al.

[11] Patent Number: 5,745,049
[45] Date of Patent: Apr. 28, 1998

[54] WIRELESS EQUIPMENT DIAGNOSIS SYSTEM

[75] Inventors: Koji Akiyama; Satoshi Yoshitake; Minoru Takeuchi; Hiroshi Shimizu; Kazuo Nagata; Kiyoshi Takai; Toshio Sekiguchi, all of Tokyo, Japan

[73] Assignee: Yokogawa Electric Corporation, Tokyo, Japan

[21] Appl. No.: 680,888

[22] Filed: Jul. 15, 1996

[30] Foreign Application Priority Data

| Jul. 20, 1995 | [JP] | Japan | 7-184164 |
| Jul. 21, 1995 | [JP] | Japan | 7-185629 |
| Jul. 25, 1995 | [JP] | Japan | 7-189015 |
| Jan. 22, 1996 | [JP] | Japan | 8-007950 |
| Apr. 16, 1996 | [JP] | Japan | 8-094044 |
| Apr. 19, 1996 | [JP] | Japan | 8-098082 |
| May 7, 1996 | [JP] | Japan | 8-112664 |
| May 14, 1996 | [JP] | Japan | 8-118815 |

[51] Int. Cl.⁶ .................................................. G01S 13/75
[52] U.S. Cl. .......................... 340/870.17; 342/42; 342/51; 340/825.54
[58] Field of Search .................... 340/870.17, 825.34, 340/825.54, 825.72, 573; 342/51, 42, 44; 364/557

[56] References Cited

U.S. PATENT DOCUMENTS

| 3,806,905 | 4/1974 | Strenglein | 340/505 |
| 4,068,232 | 1/1978 | Meyers | 342/44 |
| 4,827,395 | 5/1989 | Anders | 364/138 |
| 5,181,423 | 1/1993 | Philipps | 73/724 |
| 5,410,315 | 4/1995 | Huber | 342/51 |
| 5,422,636 | 6/1995 | Urbas | 340/825.54 |
| 5,425,032 | 6/1995 | Shloss | 340/825.54 |
| 5,444,448 | 8/1995 | Schuermann | 342/42 |
| 5,446,452 | 8/1995 | Litton | 340/870.17 |
| 5,450,088 | 9/1995 | Meier | 342/51 |
| 5,451,959 | 9/1995 | Schuermann | 342/42 |
| 5,548,291 | 8/1996 | Meier | 342/51 |

*Primary Examiner*—Jeffery Hofsass
*Assistant Examiner*—Albert K. Wong
*Attorney, Agent, or Firm*—Moonray Kojima

[57] ABSTRACT

A wireless equipment diagnosis system which can perform inspection and maintenance precisely and accurately, and which comprises sensors which measure information on each equipment being diagnosed, a transponder which transmits measured data from the sensors after modulating the measured data; a portable interrogator which acquires the measured data by receiving transmitted signals from the transponder; and a host computer which diagnoses each equipment by implementing predetermined signal processing using information stored in advance and data transferred from the acquired data.

12 Claims, 10 Drawing Sheets

WIRELESS EQUIPMENT DIAGNOSIS SYSTEM

BACKGROUND OF THE INVENTION

1. Field of Invention

This invention relates to a wireless equipment diagnosis system for diagnosing various equipment in a plant; and more particularly, to such system for early detection of deterioration and/or disorder, fault, and the like, in the equipment of chemical plants, steel plants, etc, such as pumps, valves, motors, compressors, etc, and for prevention of accidents; and also, to wireless data acquisition equipment used in such system.

2. Description of the Prior Art

Recently, plants used in various industrial fields, such as steel making, chemical production, etc, have been automated using process control systems assisted by computers and have adopted a management system wherein operators are located in a central operation room and carry out production control, operation, control, safety control, equipment control,etc. In the plants, failures or accident are usually caused by faults in various equipment. Hence, in order to prevent plant failure from occurring and to maintain safe plant operation, it is important to detect and diagnose early deterioration disorders, failures,etc, in the various equipment thereby to enable the operator to take appropriate measures, such as repair, maintenance, or replacement of equipment before a failure occurs.

A plant equipment failure diagnosis system is disclosed, for example in Japan Published Application SN 6/288,796 (1994). This system acquires data for the equipment by having a storage medium, such as an IC card, intervenes and selects measuring points, types of data, measuring interval etc, freely in response to the status of the equipment. However, the conventional system needs maintenance personnel to collect storage media, such as the IC cards, and to check each piece of equipment. If there are a large number of equipment which is in need of checking, the number of storage media increases. This leads to troublesome handling and increases the burden of the operator. In addition, the conventional system has such problems as the data stored in the IC cards cannot be check immediately , and inspection and maintenance of the equipment cannot be done at the same time and checking location referred to as data stored in the IC card.

SUMMARY OF THE INVENTION

Accordingly, it is an object of the invention to overcome the aforementioned and other deficiencies and disadvantages of the prior art.

Another object is to provide a wireless equipment diagnosis system which reduces the burden of maintenance operators, and which can check and maintain the equipment precisely and accurately.

A further object is to provide a wireless data acquisition equipment for use in such wireless equipment diagnosis system.

DETAILED DESCRIPTION OF THE PREFERRED EMBODIMENTS

Figure 1:
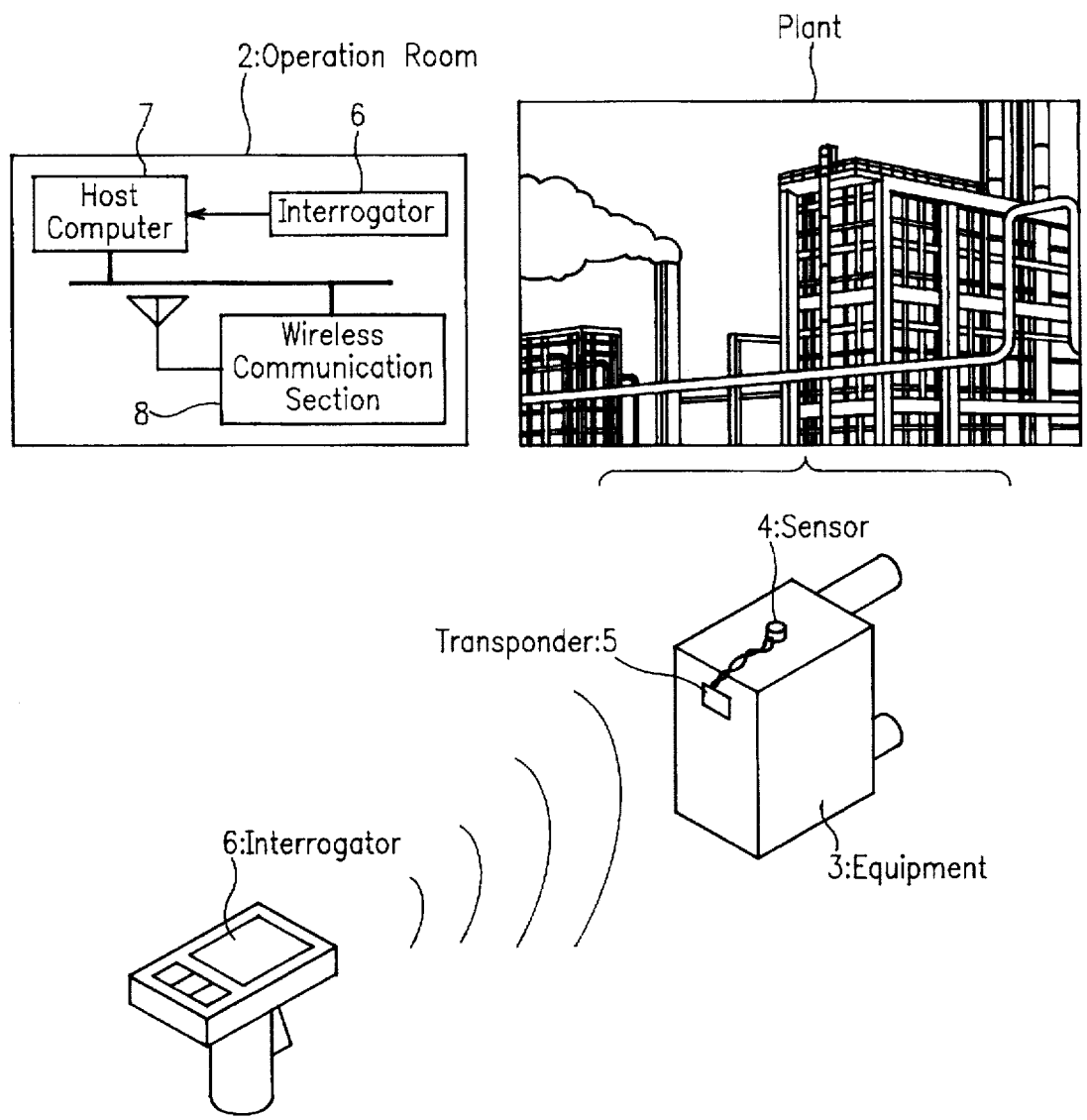
FIG. 1 is a diagram depicting a first illustrative equipment diagnosis system of the invention.

FIG. 1 shows a wireless equipment diagnosis system which can be used to diagnose a plant 1, such as a chemical factory wherein pumps, valves, reaction towers, heat exchangers, pipes,etc are installed. Plant operation is carried out through a control system, not shown, provided in an operation room 2. The plant may comprise equipment 3 , such as a blower. At least one sensor 4 is mounted on equipment 3 to detect desired information of the equipment. The sensors for detecting equipment information may comprise temperature sensors for detecting temperature changes in the equipment being diagnosed, strain sensors for detecting vibration and/or distortion accelaration sensors, and the like. Furthermore, various types of sensors may be used to measure operating loads and operating service times, and installation environment, depending on type of equipment. In addition, if the equipment handles a fluid, e.g. a valve or flowmeter, sensors for detecting concentration or temperature of fluid slurry are also used because when slurry concentration or slurry temperature changes, stress applied to the equipment also changes. These sensors may be either incorporated in the equipment or placed outside the equipment. Also, the sensors may be detectors which operate in a contact less manner.

Sensors 4 measure data of the condition of the equipment 3 and supplies such measured data to transponder 5, which then modulates a carrier wave with the measured data, and then transmits same to interrogator 6. The measured data may include measured data stored in a memory. The carrier wave may be outputted from either the transponder 5 or interrogator 6. Transponder 5 is mounted on equipment 3 which is being diagnosed and its electronic circuitry is housed in an air tight enclosure to withstand the elements, such as rain, snow, wind, etc. Transponder 5 also responds to signals from interrogator 6 and is constructed to transmit information to identify the equipment 3, or the transponder 5, in addition to other data, such as the measured data.

Interrogator 6 is constructed to be of a suitable size so that a maintenance operator can carry the interrogator 6 in one hand and engage in wireless communication with the equipment 3 within a few meters from the equipment, and furthermore, is constructed to have functions which enable acquisition of measured data outputted by transponder 5 together with identification data, and storage of the collected data. Interrogator 6 is also provided with a display unit to display the acquired data and with circuitry to switch the data acquisition function. The interrogator 6 can also communicate with host computer 7 in operation room 2.

The information acquired by interrogator 6, such as the identification of the equipment being diagnosed, its state,etc, is transferred to host computer 7 which processes the information using the data and also various information priorly stored in the computer, thereby to diagnose each equipment being diagnosed. Data are transferred between the host computer 7 and interrogator 6 using signal lines, communication buses, or wireless communication.

A wireless communication section 8 is connected to host computer 7 via communication buses, not numbered, and is constructed to communicate with interrogator 6 via an antenna. Host computer 7 can exchange data with interrogator 6 via the wireless communication section 8 and communication buses.

Figure 2:
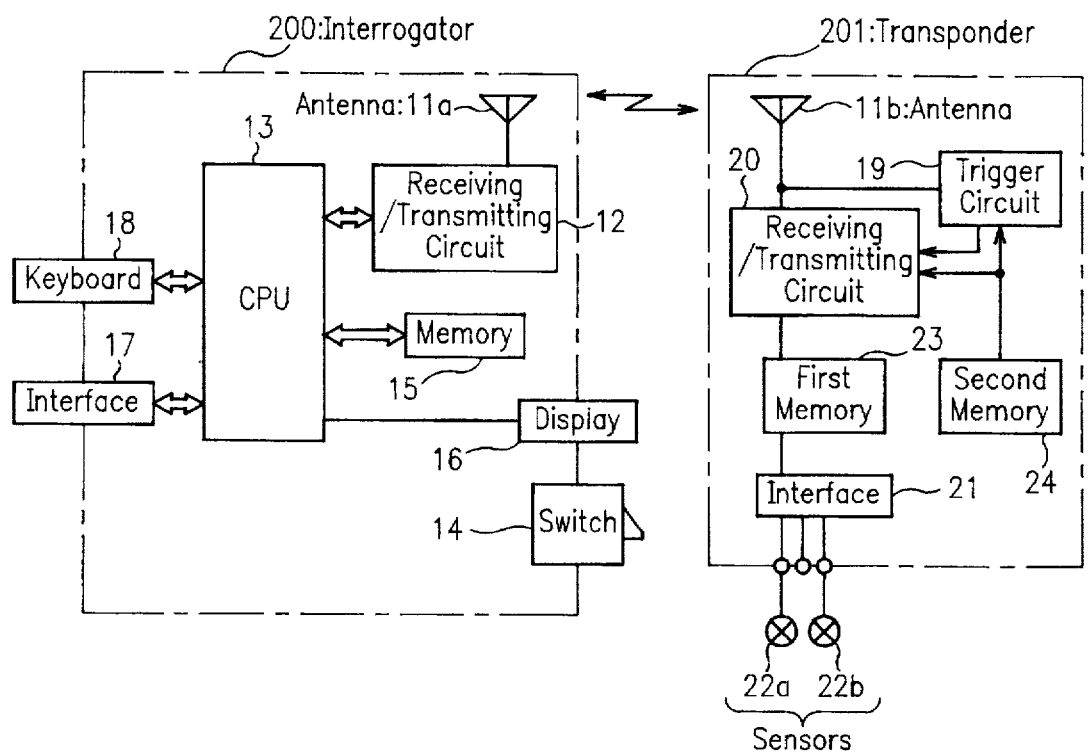
FIG. 2 is a diagram depicting an illustrative transponder and interrogator of the invention.

FIG. 2 shows details of transponder 5 (labeled 201 in FIG. 2) and interrogator 6 (labeled 200 in FIG. 2) of FIG. 1, which comprises the wireless data acquisition equipment of the invention. In FIG. 2, microwaves are used as an example of wireless communication Interrogator 200 comprises an antenna 11a (which may be disposed either inside or outside of a case holding the interrogator 6) which has a directivity to transmit microwaves intensely in a desired direction. A receiving/transmitting circuit 12 having a modulation-demodulation function is connected to antenna 11a. A microprocessor 13 (called "CPU") controls the operation of interrogator 200. Switch 14, which can be operator controlled, is turned ON to switch a start up signal to trigger transponder 201 and to acquire data outputted by transponder 201. Memory 15 stores the acquired data. Display 16 displays the data. Both memory 15 and display 16 are connected to microprocessor 13. Display 16 provides various displays for checking the identification address of a targeted transponder 201, for setting and checking commands to be sent to the transponder 201, and for checking transfer of various data acquired by interrogator 200 to host computer 7. A communication interface 17 is provided to communicate with external devices, such as computer 7. A keyboard 18 is designed to enable selection of commands, parameter settings, identification address settings, and selection or setting of data to be displayed in display 16. Interrogator may transfer the acquired data during data acquisition and stored in memory 15 to host computer 7 and also display information transmitted from host computer 7 in display 16. In addition, interrogator 200 may be connected to an existing notebook personal computer and parts of the foregoing functions can be provided in such personal computer.

Transponder 201 comprises an antenna 18 and a trigger circuit 19 for receiving signals received via antenna 18, and for triggering receiving/transmitting circuit 20 when an identification address for transponder 201 is included in the received signal. Trigger circuit 19 comprises a detection circuit for the pattern of the identification address assigned to transponder 201; a switch circuit for supplying power to circuit 20 when the identification address is detected. Circuit 20 interprets commands in data received through antenna 18 by demodulating the received signals and transmits the modulated data. Interface 21 includes A/D converters and receives measured signals from various sensors 22a, 22b connected to input terminals. A first memory 23 receives and stores signals from sensors 22a, 22b attached to respective measuring positions on the object being diagnosed. The storage is done together with measured time information. In addition, first memory 23 is necessary when measured signals from sensors 22a, 22b are stored in a constant time interval and the stored data are transmitted in response to a trigger signal from interrogator 200. Thus, when it is sufficient to transmit measured signals at a time only when a trigger signal from interrogator 200 is received, first memory 23 is not needed. A second memory 24 stores the identification address of transponder 201. The stored identification address includes those assigned to each equipment being diagnosed or to each sensor separately. Setting identification addresses for each transponder 201 may be accomplished by an identification address setting command from interrogator 200 through wireless communication.

Operation of the embodiment of FIG. 2 is as follows. Transponder 201 is attached in advance to each equipment being diagnosed (see FIG. 1) and receives, as inputs, measured signals from each sensor 22a, 22b mounted in various locations on equipment 3. Interface 21 and first memory 23 are maintained in an operated state, and measured signals from each sensor 22a, 22b are stored in memory 23 together with measured time and information indicating measured positions. An operator inspects and maintains each equipment by following a predetermined route, for example, once a day, and carries interrogator 200. In this manner, data are acquired from transponder 201 attached to each equipment to be diagnosed as described below.

(A) The distance between transponder 201 and interrogator 200 is set so that microwaves can connect the two, for example, between 1 to 5 meters. Interrogator 200 is directed toward transponder 201 and switch 14 is turned ON. This allows a startup signal, including the identification address specifically assigned to a particular transponder 201, to be transmitted from interrogator 200, and which start up signal is received then by transponder 201.

(B) In transponder 201, which receives the start up signal, trigger circuit 19 discriminates whether the identification address included in that particular start up signal coincides with the particular transponder's identification address. If the signal coincides power is supplied to receiving/transmitting circuit 20, thereby placing the circuit in an operating state.

(C) If receiving/transmitting circuit 20 is in an operating state in transponder 201, circuit 20 interprets the content or command in the received start up signal, reads the required data from memory 23,depending on the command, and transmits the data added by the transponder's own identification address to interrogator 200.

For the contents or commands of the start up signal, there are commands to transmit data gathered after the previous data acquisition, to transmit measured data only at the current time, to transmit measured data for only the designated sensor, and, in addition, commands to select the mode in which various parameters within transponder 201 are set, such as range, computation constants, type of sensor,and the like, to transmit by reading various parameters which have been set,etc. The foregoing commands are sent in interrogator 200.

(D) In interrogator 200, when data transmitted from transponder 201 are received, the transmitted data are stored in memory 15, after the identification address included in the received signal is collated and checked to determine whether both addresses coincide. In the data stored in memory 15, the identification address, measuring time, and measured data are included.

Interrogator 200 is set so that the measured data transmitted from transponder 201 can be indicated on the screen of display 16 directed by keyboard 18. Accordingly, the operator can maintain or inspect the equipment being diagnosed and concurrently refer to the acquired data. A sequence may also be prepared wherein interrogator 200 first transmits a start up signal, receives a response thereto, indicates an identification address included in the response at the same time, confirms coincidence of identification addresses, and then sends again a command to transmit the data to transponder 201.

The foregoing steps (A) through (D) terminates data acquisition from transponder 201. Then, in the same manner, the operator goes to the next equipment to be diagnosed, acquires data in the same manner, and after completing data acquisition for all of the equipment on the inspection route, returns to the operation room 2.

(E) The operator returns to operation room 2 and connects interrogator 200 to host computer 7 via communication interface 17 and transfers the data stored in memory 15 to host computer 7. In addition, data may be transfered from interrogator 200 to host computer 7 via communication section 8 using wireless transmission.

(F) Host computer 7 determines deteriorated states and/or failures in each equipment being diagnosed using the measured data transfered from interrogator 200. Computer 7 then makes appropriate desired computations and analysis and outputs the desired information in the desired manner of display.

Figure 3:
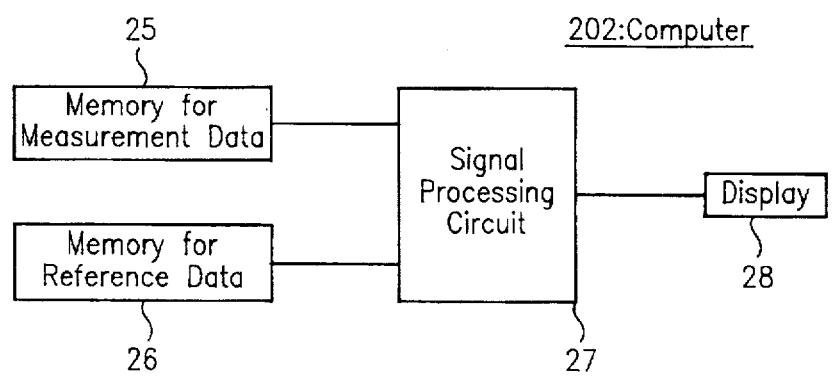
FIG. 3 is a functional block diagram depicting an illustrative equipment failure diagnosis function implemented in a host computer.

FIG. 3 shows the equipment failure diagnosis function as implemented by host computer 202 (labeled 7 in FIG. 1), wherein memory 25 is provided for measurement data in which data are transferred from interrogator 200; and memory 26 is provided for reference data, in which various reference data provided by the manufacturer and reference data specified in relevant standards, such as JIS and ISO, are stored. The data stored in memory 25 are processed for their rms values, averages, peak values, crest factors, etc, or signal processing, e.g. envelope taking or FFT analysis, etc, is implemented. A signal processing circuit 27 compares data read from memory 25 with the corresponding data read from memory 26, for example, at their absolute values and/or relative values. Diagnosis of each equipment is carried out in circuit 27 by discriminating whether the acquired data are within the reference data (i.e. data specified in various standards, such as JIS and ISO) or within the ranges provided by manufacturers. The diagnosis leads to an accurate diagnosis of the system by combining several evaluation results and/or executing logical operations for each evaluation result. For obtaining diagnosis of the remaining life and/or failure prediction, a time series evaluation of measured data is desirable. The evaluated results are indicated in display 28.

Figure 4:
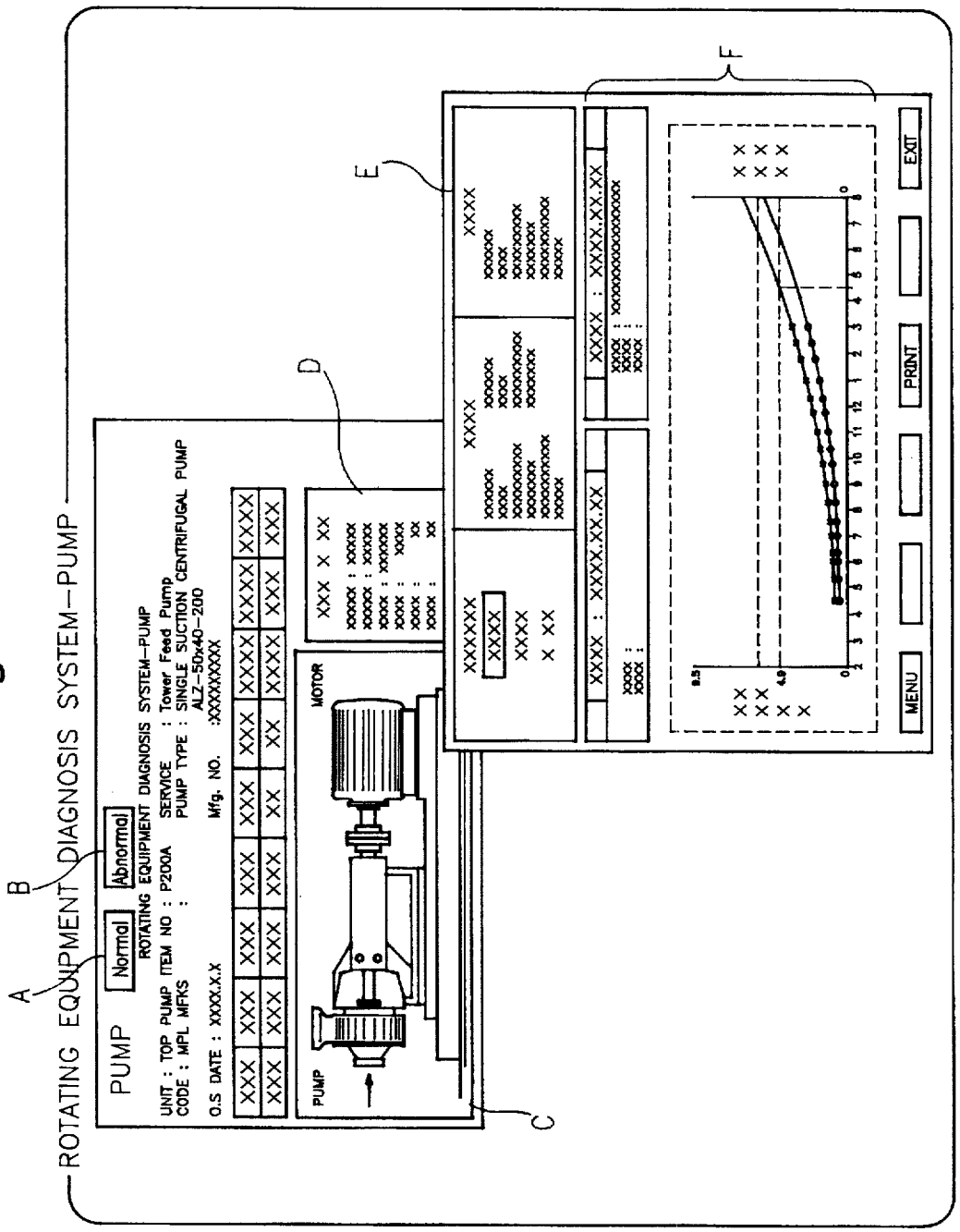
FIG. 4 is a diagram depicting an output screen displayed in a display means of a host computer.

FIG. 4 shows an example of the output screen of display 28 of host computer 7, wherein the output screen displays a pump. In the upper part of the screen, display fields A and B indicate whether equipment output from signal processing circuit 27 is normal or abnormal. On the screen, display field C indicates construction of the equipment , for example a pump in this instance, to be diagnosed, data display field D indicates the operating state of the equipment, i.e. the latest data acquired by interrogator 200, the cause of equipment abnormality display field E indicates the cause only when the equipment is determined to be abnormal, and display field F indicates the predicted service life. Display field E, displayed when the data are determined to be abnormal may be configured so that it is automatically displayed as a window when the data are determined as being abnormal or may be configured so that it is displayed at the direction of the operator. Also, the screen may be a guidance display to direct the operator on how to take action, e.g. directions on how to reduce operating load.

In the foregoing, microwave is used between transponder 201 and interrogator 200. However, infrared rays may be used, in which case, antennas 11 and 18 would be replaced with infrared devices. Transponder 201 may also incorporate a microprocessor or the like, and employe more functions, as desired.

Advantageously, the embodiments of FIGS. 1, 2 and 3, enable one to easily and simply acquire diagnosis data with wireless communication between the interrogator and transponder, and that diagnosis data can be readily accessed. Thus, the inspection and maintenance of equipment in an industrial plant can be accomplished precisely and accurately and the tediousness of such inspection is reduced.

Figure 5:
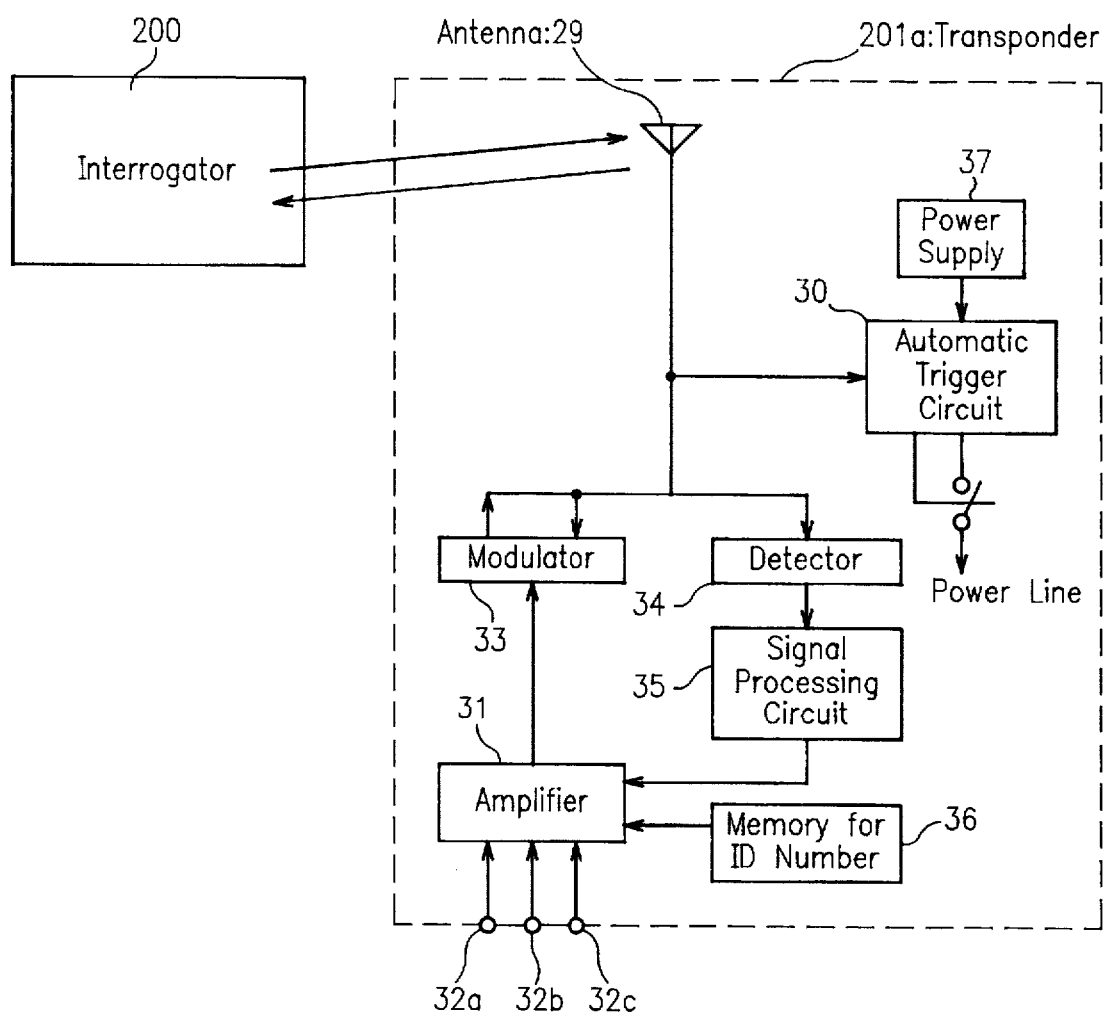
FIG. 5 is a diagram depicting another illustrative transponder of the invention.

FIG. 5 shows another transponder 201a used together with the interrogator 200 of FIG. 2. The transponder 201 comprises an antenna 29 for receiving interrogation waves at a desired directivity; an automatic trigger circuit 30 which supplies power to and triggers each appropriate circuit when the identification signal for its own transponder is detected in a signal transmitted from interrogator 200; an amplifier 31 for receiving external input signals in which measured analog signals are inputted via external input terminals 32a, 32b, 32c, and are analog to digital converted , and status signals, digital signals, response identification signals, etc, are also subjected to desired conversion to prepare base band signals, i.e. modulation signals, and then outputted to modulation circuit 33. A detector 34 detects and demodulates an interrogation wave transmitted from interrogator 200. A signal processing circuit 35 interprets a command in signals demodulated in detector 34 and outputs this signal. Modulator 33 modulates a carrier transmitted from interrogator 200 with a modulation signal outputted from amplifier 31. A memory 36 is provided for the identification (ID) number and serves as indentification by setting different numbers when there are a number of transponders 201a. A power supply 37 is provided wherein a cell is used for a card type transponder.

Operation of transponder 201 is as follows. When transponder 201a is triggered by automatic trigger circuit 30, modulator 33 modulates the carrier which outputted from amplifier 31 with a base band signal and received by antenna 39, and the modulated signal is transmitted to interrogator 200 from antenna 29. The base band signal is a modulation signal outputted from amplifier 31 using transponder 201a identification number and input signals from sensors applied to amplifier 31 , based on a command contained in the output signal from signal processing circuit 35.

The construction and operation of interrogator 200 are the same as in FIG. 2, and therefore, description thereof is omitted hereat for sake of brevity. The communication method between the transponder and interrogator is the same as in FIG. 2.

Transponder 201a produces the following effects. By mounting sensors for temperature, pressure, vibration,etc, data thereof can be read in a non-contact manner as desired. Also, since the data are read out by a portable interrogator and processed separately, cost can be controlled optimally. Also, devices needing high volume data processing need not be moved. Since signals from sensors can be transmitted automatically, interrogation at a single location can be expedited. Also, service life of the transponder and interrogator is extended because operation of these devices need be limited to only when data is read out.

However, in the embodiments of FIGS. 1–5, when the receiving/transmitting circuit, modulator, etc, which are part of the transponder are stopped until a start up signal or interrogation wave from the interrogator is detected, data must be measured from sensors connected to the transponder for the first time when the interrogation wave is received. Consequently, if the data are required to be measured at a constant interval, there is a problem in that data collection operator must acquire data by visiting the equipment being diagnosed at constant intervals.

Figure 6:
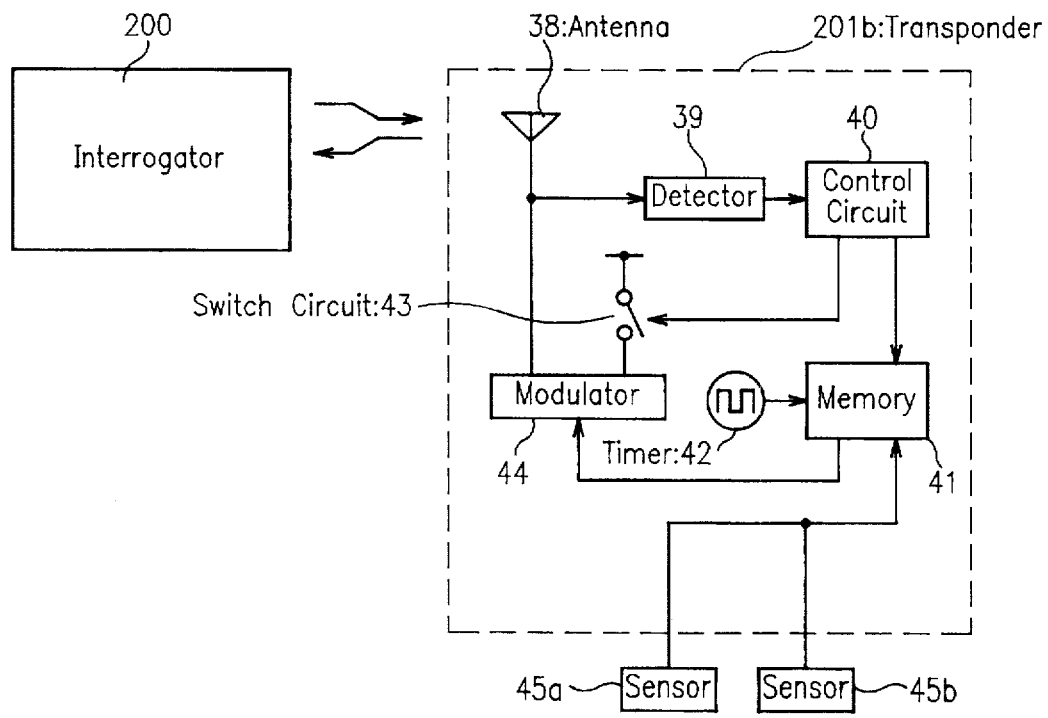
FIG. 6 is a diagram depicting a first illustrative wireless data acquisition equipment of the invention.

FIG. 6 shows another wireless data acquisition equipment wherein the foregoing problem is resolved. The embodiment comprises transponder 201b comprising antenna 38, detector 39, control circuit 40, memory 41, timer 42, switch circuit 43, modulator 44, and sensors 45a, 45b. The interrogator 200 is the same as in FIG. 2. Components 38–44 comprises transponder 201b. In transponder 201b, the input/output terminal of antenna 38 is connected to the input terminal of detector 39 and to the output terminal of modulator 44. The output terminal of detector 39 is connected to control circuit 40. One output terminal of control circuit 40 is connected to memory 41 and the other output terminal is connected to the control terminal of switch circuit 43. The start up signal from timer 42 and the output signals from sensors 45a, 45b are applied respectively to memory 41. The output terminal of memory 41 is connected to modulator 44. In addition, a supply voltage is supplied to the input terminal of switch circuit 43 and the output terminal of switch 43 is connected to the power terminal of modulator circuit 44.

Operation of the embodiment of FIG. 6 is as follows. Timer 42 triggers memory 41 at a constant interval regardless of the presence/absence of an interrogation wave from interrogator 200. Memory 41, when triggered, measures data from sensors 45a, 45b and stores therein the measured data. That is, transponder 201b operates intermittenly to measure data and, at the same time, to store the data measured at constant intervals, in turn. For example, when sensors 45a, 45b are temperature sensors, and atmospheric temperatures during the day are to be measured, the constant interval may be set to one hour. That is, the constant interval may be set depending on the measuring object and purpose thereof.

On the other hand, if measured data are to be acquired by interrogator 200, interrogator 200 transmits commands to transponder 201b after modulating the data using Amplitude Shift Keying (ASK) modulation. Transponder 201b receives the modulated signal with antenna 38, then demodulates the signal with detector 39, and then outputs the demodulated signal to control circuit 40. Control circuit 40 extracts the command from the signal received from detector 39, then interprets the content of the command and carries out the desired processes. For example, if the content of the command is a data reading request, control circuit 40 turns ON switch circuit 43 and supplies voltage to modulator 44. On the other hand, control circuit 40 reads desired data among data store din memory 41 and causes memory 41 to output the desired data to modulator 44. Modulator 44 modulates the unmodulated interrogation wave from interrogator 200 using Binary Phase shift Keying (BPSK) modulation based on the output of memory 41 and reflects the modulated signal back to interrogator 200. As a result, the measured data in a fixed interval can be acquired in one data acquisition by triggering memory 41 in a fixed interval regardless of the presence of interrogation waves and automatically measuring and storing data in a fixed interval.

In addition, since measurement for sensors 45a, 45b does not begin with the detection of the interrogation wave from interrogator 200, but measurement for sensors 45a, 45b is completed in advance, the communication time required for data acquisition is reduced. Also, by starting modulator 44 when an interrogation wave from interrogator wave from interrogator 200 is detected, the power consumption in transponder 201b is reduced. Communication between interrogator 200 and transponder 201b is not limited to use of electromagnetic waves; rather , other forms of communication may be used, such as use of light waves, infra-red rays,etc. Moreover, the interval for generating a trigger signal for timer 42 may be set with commands from interrogator 200. Furthermore, sensors 45a, 45b are not limited to temperature sensors.

Advantageously, the FIG. 6 embodiment enables acquisition of measured data in a fixed interval by automatically triggering the memory in a fixed interval regardless of the presence of interrogation waves, and the data can be measured and stored in that fixed interval. Also, if a pressure sensor, which changes sensitivity depending on temperature changes, is used, the transponder should transmit information on pressure and temperature to the interrogator so that temperature compensation can be carried out. If a temperature sensor is not used, the temperature must be measured with the interrogator itself or be compensated for by measuring the temperature independently. In such case, the following problem occurs.

Where temperature compensation is needed, multiple sensors are usually required in the interrogator 200. This requires a a complex circuit configuration. Also, if multiple data, such as pressure and temperature data are transmitted to the interrogator, in order to provide temperature and pressure compensation, the data which is transmitted increases greatly in number and hence, the transmission time is increased, thereby causing increased possibility of communication error.

Figure 7:
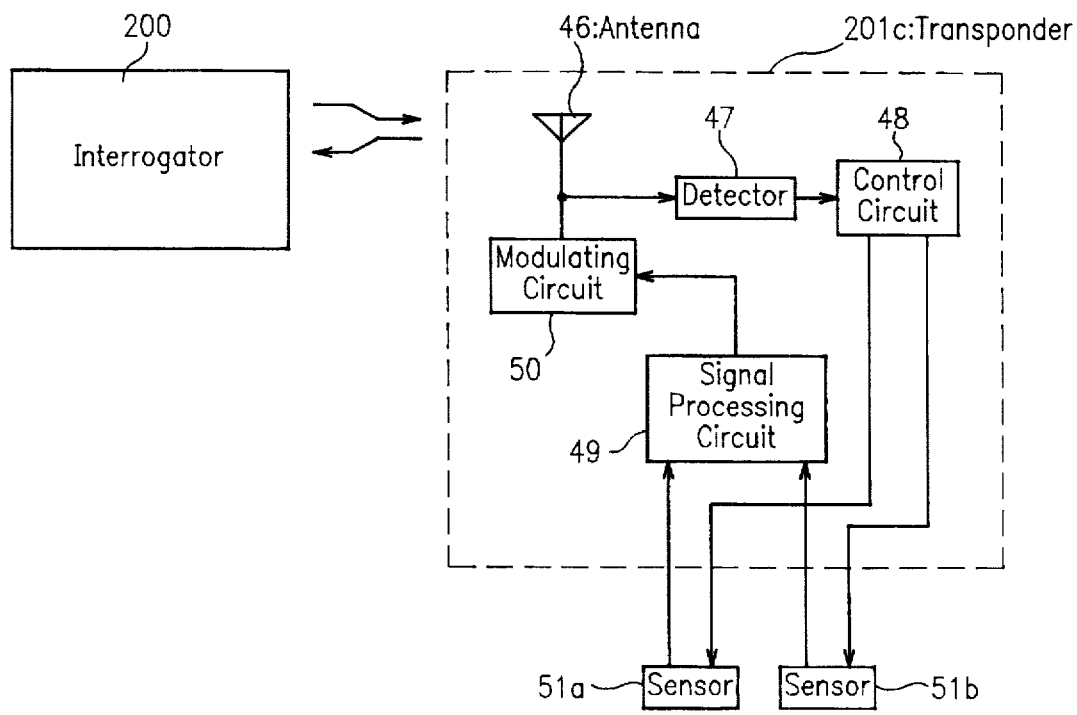
FIG. 7 is a diagram depicting a second illustrative wireless data acquisition equipment of the invention.

FIG. 7 shows a wireless data acquisition equipment which solves the foregoing problem, wherein transponder 201c comprises an antenna 46, detector 47, control circuit 48, signal processing circuit 49, modulator circuit 50, sensors 51a, 51b. Interrogator 200 is the same as that in FIG. 2. In transponder 201c, the intput/output terminal of antenna 46 is connected to the input terminal of detector 47 and to the output terminal of modulating circuit 50. The output terminal 47 is connected to the input terminal of control circuit 48. The output terminals of control circuit 48 are connected to each control terminal of sensors 51a, 51b, and the output terminals of sensors 51a, 51b are connected to signal processing circuit 49. The output terminal of signal processing circuit 49 is connected to modulation circuit 50.

The operation of the embodiment of FIG. 7 is as follows. First, interrogator 200 transmits a command to transponder 201c after modulating the command using ASK modulation. Transponder 201c receives the modulated signal with antenna 46, demodulates the signal with detector 47 and outputs the signal to control circuit 48. Control circuit 48 extracts the command from the signal inputted from detector 47 and interprets the content of the command and implements the desired processing.

For example, where sensor 51a is a pressure sensor and sensor 51b is a temperature sensor, and the output data from sensor 51a must be compensated for the temperature, if a command from interrogator 200 is a request for a temperature compensated pressure data reading, control circuit 48 sends control signals to the control terminal of sensors 51a, 51b to put sensors in an operating state. The output data from sensors 51a and 51b are inputted to signal processing circuit 49. Signal processing circuit 49 compensates the output data of sensor 51a for the output data of sensor 51b and outputs the results to modulating circuit 50. Modulating circuit 50 modulates the unmodulated interrogation wave from interrogator 200 using BPSK modulation, or the like, based on the output from signal processing circuit 49 and reflects the modulated wave back to interrogator 200. As a result, transponder 201c transmits only the processed results to interrogator 200, after implementing necessary processing on the output data from two or more sensors based on a command transmitted from interrogator 200. Thus, the number of data to be transmitted is reduced.

In addition,although signal processing circuit 49 processes two or more data, if signal processing is not needed, then signal processing circuit 49 need not be operated. That is, if a command from interrogator 200 requests read out of raw pressure data not compensated for temperature, control circuit 48 sends a control signal only to the control terminal of sensor 51a to operate sensor 51a. The output data from sensor 51a is applied to circuit 49 which outputs data from sensor 51a to modulator 50 without processing such data. Modulating circuit 50 then modulates the unmodulated interrogation wave from inerrogator 200 based on the output from signal processing circuit 49 using BPSK modulation, or the like, and reflects the modulated wave back to interrogator 200.

Also, for example, since a command from interrogator 200 is a request to read temperature data for compensation, control circuit 48 sends a control signal only to the control terminal of sensor 51b to operate sensor 51b, and then, the same processing as above is carried out. As a result, transponder 201c can transmit a signal to interrogator 200 without processing the output data from the sensors based on the command transmitted from interrogator 200. This enables desired data, such as raw pressure data not compensated for temperature or temperature data for compensation, to be freely read out.

The communication mode between the interrogator and transponders is not limited to electromagnetic waves; for example light waves, infrared rays,etc, may be used. Moreover, processing circuit 49 may be programmed externally. Also, sensors 51a, 51b are not limited to pressure and temperature sensors; other physical characteristics can be monitored by other types of sensors. Also, the locations of such sensors can be altered to be inside the equipment.

Advantageously, by providing a signal processing circuit in the transponder to process the data from one or more sensors as directed by commands from a portable interrogator, and carried out by wireless communication, the intercommunication can be carried out with reduced number of data being transmitted.

Returning to FIG. 6, measured data in a fixed interval can be supplied to interrogator 200 by periodically triggering memory 41 using timer 42 based on preset period data regardless of the presense of an interrogation wave and by measuring the output data from sensors 45a and others at a fixed interval and by storing the data in memory 41. However, in the embodiment of FIG. 6, whether the values measured with the sensors is within the reference values or not is decided by comparing the data with reference values previously stored in interrogator 200 after gathering daat in interrogator 200. For this reason, each reference value data must be stored previously in interrogator 200 before the operator starts his inspection tour. Also, there is problem in that as the number of location is increased, the reference value data stored in interrogator 200 is increased. Thus, the usable memory space in interrogator 200 is reduced.

In addition, when output data from sensor 45a, and the like, are measured at a fixed interval of time using timer 42, whether the measured data values are within the reference value range cannot be made known until interrogator 200 acquires stored data from the transponder 201b. Furthermore, if the measured data are outside the reference values, it is a generally used measure to observe an abnormal condition by shortening the measurement interval. In that case, there is a problem in that the measurement interval cannot be changed until interrogator 200 completes acquisition of data from transponder 201b.

Figure 8:
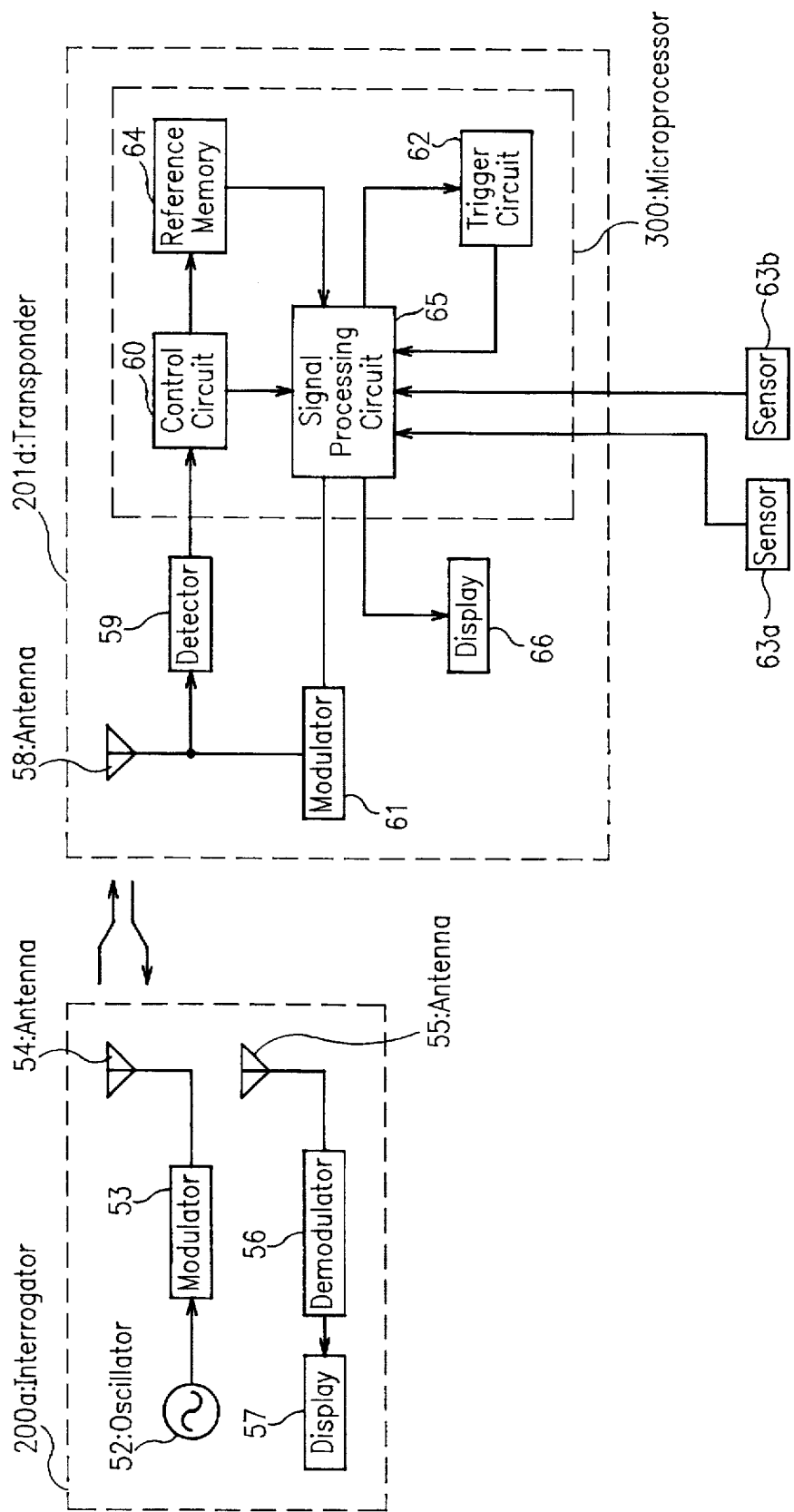
FIG. 8 is a diagram depicting a third illustrative wireless data acquisition equipment of the invention.

FIG. 8 shows a wireless data acquisition equipment which solves the foregoing problem, wherein interrogator 200a, transponder 201d and microprocessor 300 comprise: an oscillator 52, modulators 53,61, antennas 54,58, demodulator 56, display 57, detector 59, control circuit 60, a trigger circuit 62, sensors 63a, 63b, reference memory 64, signal processing circuit 65, and a display 66 using LED or the like, all as shown. That is components 62–57 comprise interrogator 200a; components 58–62,64,65, and 66 comprise transponder 201d, and components 60,62,64 and 65 comprise microprocessor 300, respectively.

In interrogator 200a, the output terminal of oscillator 52 is connected to modulator 53, and the output terminal of modulator 53 is connected to antenna 54. The output terminal of antenna 55 is connected to demodulator 56 and the output terminal of demodulator 56 is connected to display 57.

In transponder 201d, the output terminal of antenna 58 is connected to detector 59 and the output terminal of detector 59 is connected to control circuit 60. The output terminal of control circuit 60 is connected to both reference memory 64 and signal processing circuit 65. The output terminals of signal processing circuit 65 are connected to modulator 61 and display 66. The output terminal of modulator 65 is connected to antenna 58. Trigger circuit 62 is connected by input and output terminals to signal processing circuit 65. The output terminal of reference memory 64 is connected to signal processing circuit 65, which is also externally connected to sensors 63a, 63b.

The operation of the embodiment of FIG. 8 is as follows. Note that the interrogator 200 of the prior embodiments have an antenna used together with a circulator for both transmission and reception, but in the embodiment of FIG. 8 shows two antennas provided without use of a circulator, with the two antennas being used separately for transmission and reception, respectively.

Interrogator 200a is battery driven,since it is portable and is carried around on the inspection round by the operator, and transmits interrogation waves generated by implementing amplitude modulation on the output signal of oscillator 52 with modulator 53 to transponder 201d. Transponder 201d receives the interrogation waves with antenna 58, detects the waves with detector 59 and then outputs the detected waves to control circuit 60. Control circuit 60 receives data and/or commands sent from interrogator 200a and processes the data and/or commands together with the received waves.

For example, for a command to read the measured data from sensor 63a connected externally, the transponder 201d receives the output data from sensors 63a in signal processing circuit 65. At that time, interrogator 200a transmits the output of oscillator 52 directly, as unmodulated interrogation waves, to transponder 201d. Transponder 201d drives modulator 61 based on the received output data, and reflects the waves back to interrogator 200a after processing the response waves using the unmodulated interrogator waves with BPSK modulation using antenna 58. Interrogator 200a receives the BPSK modulated response waves from transponder 201d with antenna 55, and displays the output data of sensor 63a on display 57 after demodulating the contents of the response waves using demodulator 56.

Next, the measured data are judged as to normal or abnormal condition in the following manner. First, interrogator 200a transmits in advance reference values to reference memory 64 in transponder 201d. Transponder 201d obtains measured data from sensor 63a, and others, by action of trigger signals in the interrogation waves from interrogator 200a or by periodic triggering using trigger circuit 62, and then stores the data in signal processing circuit 65. Signal processing circuit 65 compares the stored data with reference values stored in reference memory 64 and judges whether the stored data are within the reference value or not; in other words, whether the data are of "normal condition" or "abnormal condition". When the measured data are to be transmitted to interrogator 200a, on request from interrogator 200a, the data for either "normal condition" or "abnormal condition" are transmitted together with the measured data. Interrogator 200a, which receives the data, indicates "normal condition" or "abnormal condition" on display 57. For example, if transponder 201d is monitoring room temperature, the reference value would be stored in advance in memory 64 of transponder 201d. A signal which shows "normal condition" when the output signal from sensor 63a (being a temperature sensor) is within the range of the reference values "15° C. to 25° C." will be transmitted to interrogator 200a together with the measured data. Otherwise, a signal showing "abnormal condition" will be sent to interrogator 200a together with the measured data. Thus, it is not necessary to store the reference values in the interrogator 200a, and a smaller memory can be used in interrogator 200a. Also, with such reference being stored in the transponder, the failure type diagnosis can be readily made with such transponder.

The foregoing conditions can be displayed in display 66. For example, if LED's are used, a green LED is lit when the measured data are in "normal condition", and a red LED is lit when the measured data is in an "abnormal condition".

As a result, normal or abnormal condition can be judged without the operator having to carry around interrogator 200a by providing display 66 in transponder 201d and having the normal or abnormal condition displayed in dislay 66. If an operating method is used which acquires data only in the transponders which has such display 66, the number of locations of equipment to be visited by the operator during an inspection tour can be reduced.

Moreover, if measured data is acquired from sensor 63a by periodic triggerings, e.g. using trigger circuit 62, and comparisons periodically made between the measured data and reference values, signal processing circuit 65 can analyze the trend of the data visa-vis the reference values. Thus, if an abnormal trend developes, the trigger circuit can be adjusted to reduce the time between the periodic acquisition of data. For example, if transponder 201d measures data in a 60 minute cycle during normal state, as soon as an abnormal trend is determined by signal processing circuit 65, the period may be shortened to say 30 minutes, or 20 minutes, etc to operate at an optimal interval. As a result, precise data trend management becomes possible by merely adjusting independently the measuring interval used by transponder 201d in acquiring data.

Since transponder 201d is driven by a battery, power consumption is reduced by use of flashing lights in place of continuous light. Using a power supply of suitable capacity, an LCD display can be used in transponder 201d showing the status, such as "normal condition" or "abnormal condition",etc. In the embodiment of FIG. 8, data of "normal condition" or "abnormal condition" are transmitted together with the measured data. But, also, the reference values may be transmitted to interrogator 200a for comparison and judgment.

In FIG. 8, microprocessor 300 is described in terms of control circuit 60, trigger circuit 62, reference memory 64, and signal processing circuit 65, however, the functions of such components may be realized using a single microprocessor. The FIG. 8 embodiment has the following advantages. By storing the reference values in the transponder, condition of the equipment can be determined using only the transponder. Also, in that case, the interrogator memory can be reduced thereby reducing the size of such interrogator and the cost thereof. Also, advantageously, the determination of the "normal condition" or "abnormal condition" of the equipment being diagnosed can be made without use of the interrogator. Also, precise data trend can be determined with the transponder and an optimal measurement interval can be adjusted without wholesale change in the interrogator.

However, the embodiments of FIGS. 6 and 8 do not specify the date of measurement although data is measured at fixed intervals using a timer.

Figure 9:
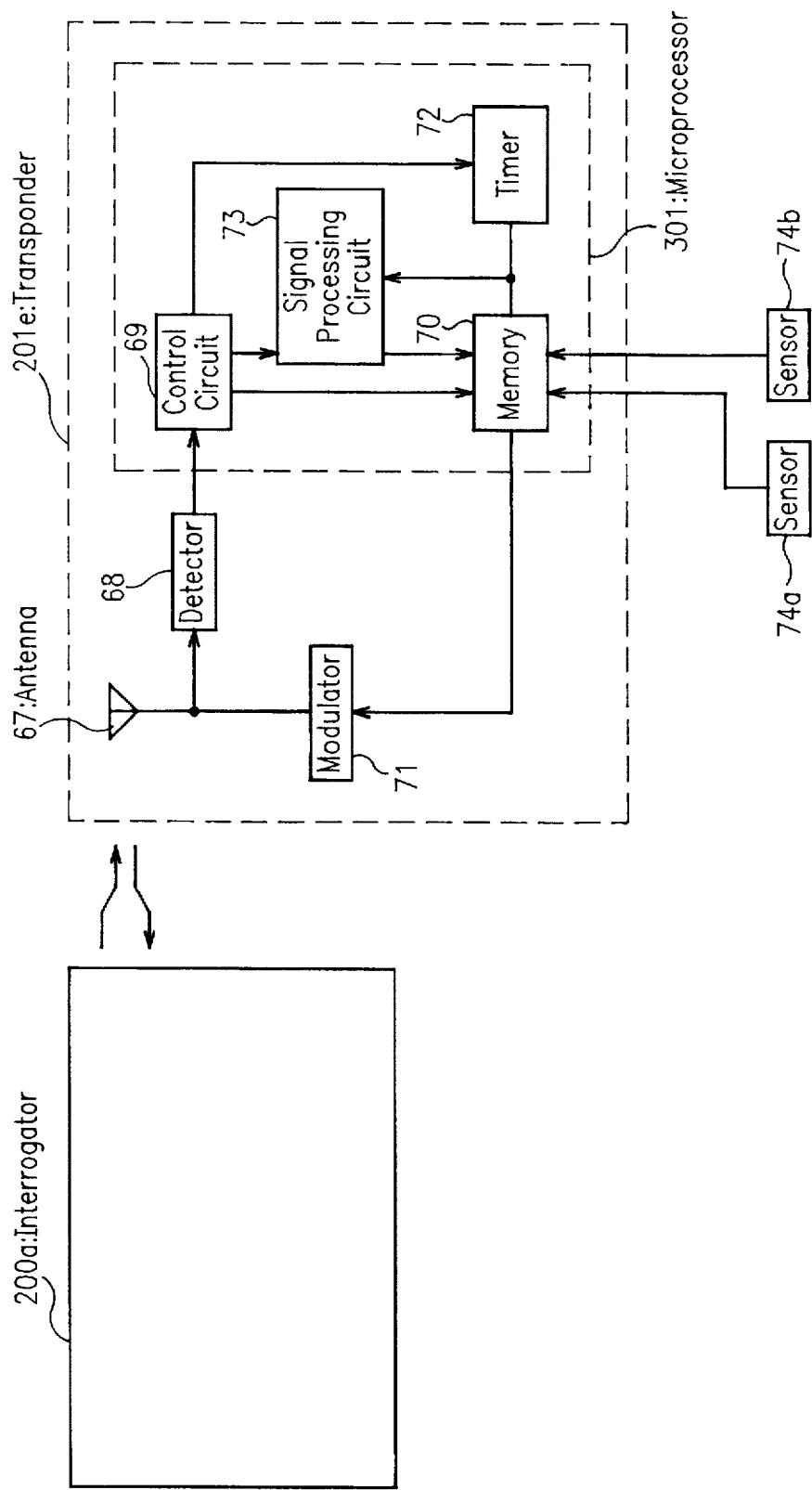
FIG. 9 is a diagram depicting a fourth illustrative wireless data acquisition equipment of the invention.

FIG. 9 shows a data acquisition equipment which resolves the foregoing problem. FIG. 9 shows an interrogator 200a, a transponder 201e and microprocessor 301 comprising an antenna 67, a detector 68, a control circuit 69, a memory 70, a modulator 71, a timer 72, a signal processing circuit 73, and sensors 74a, 74b. Components 67–73 comprise the transponder 201e, and components 69,70,72 and 73 comprise microprocessor 301, respectively.

In transponder 201e, the output terminal of antenna 67 is connected to detector 68 and the output terminal of detector 68 is connected to control circuit 69. The output terminals of control circuit 69 are connected to timer 72, memory 70, and signal processing circuit 73, respectively. The output terminal of timer 72 is connected to memory 70 and signal processing circuit 73. The output terminal of signal processing circuit 73 is connected to memory 70. The output terminal of memory 70 is connected to modulator 71 and the output terminal of modulator 71 is connected to antenna 67. The output terminals of sensors 74a, 74b are connected to memory 70, respectively.

The operation of the embodiment of FIG. 9 is as follows. Interrogation waves from interrogator 200a are transmitted to transponder 201e, which receives the interrogation waves with antenna 67, then detects the waves with detector 68, and then supplies the detected signals to control circuit 69. Control circuit 69 carries out suitable processing based on the data and commands from interrogator 200a.

For example, for a command to read measured data from sensor 74a connected externally, control circuit 69 obtains data from sensor 74a placed in memory 70 by controlling memory 70. In this case, interrogator 200a transmits unmodulated interrogation waves to transponder 201e. Transponder 201e drives modulator 71 based on the obtained output data and reflects back the response waves,obtained by modulating the unmodulated interrogation waves using a BPSK modulation, to interrogator 200a. Interrogator 200a again receives and demodulates the response waves from transponder 201e and then implements suitable processing.

Next, data measurement during a fixed interval by timer 72 is accomplished as follows. Interrogator 200a transmits a command to direct a fixed interval triggering by timer 72 to transponder 201e. In this case, transmitted are the reference time data, such as the current data, together with the command to transponder 201e. Transponder 201e receives the command and time data using antenna 67 and detector 68 and supplies the information to control circuit 69. Control circuit 69 sets the triggering interval, and the like, to timer 72 based on the command, and at the same time, stores the time data in signal processing circuit 73. After a fixed time elapses, trigger signals from timer 72 are supplied to memory 70 and signal processing circuit 73. Signal processing circuit 73 computes the dates when the measurement data are to be acquired based on the time data stored in advance and the triggering interval set in timer 72 For example, if the command is to be received at 18:00 on March 15th and the triggering interval is 60 minutes, the dates are computed so that the first triggering is at "19:00" on March 15th, the second triggering is at "20:00" on March 15th . . . the sixth triggering is at "0:00" on March 16th, etc.

On the other hand, memory 70 receives and stores output data from sensors 74a, etc. In this case, the results of computation in signal processing circuit 73 are stored in turn together with the measured data as time data. Interrogator 200a can read the measured data and time data as one data set. As a result, the measurement date for the measured data can be specified by storing triggering data for timer 72 in the signal processing circuit 73, in advance, the computing the measurement date based on the time data, and then storing the computed data together with the measured data.

Although timer 72 measures the relative time as discussed in connection with FIG. 9, a real time timer may be used. The output period of timer 72 may also be variable. As is apparent from the foregoing description, the embodiment of FIG. 9 has the following advantages. The triggering date and time for timer 72 are stored in advance in signal processing circuit 73, and thus the measurement date based on such triggering date and time together with measured data can be stored in the signal processing circuit 73. Thus, data can be obtained readily and automatically on the desired measurement dates and times.

In interrogator 200 of FIGS. 2,5,6, and 7, one antenna is used together with a circulator for both transmission and reception. However, on the other hand, in the interrogator 200a of FIGS. 8 and 9 two antennas are used, one for transmission and the other for reception without use of circulator. If the interrogator is desired to be smaller, and thus, use only one antenna, the use of a circulator increases the cost thereof. On the other hand, if two antennas are constructed using a printed circuit board having a normal dialectric constant,reducing the number of antennas to one would not be feasible since the antenna itself would be large. On the other hand, if the printed circuit board is made of high dieletric constant, the interrogator can be made smaller, but the antenna gain is reduced and transmission/reception distance would be shortened.

Figure 10:
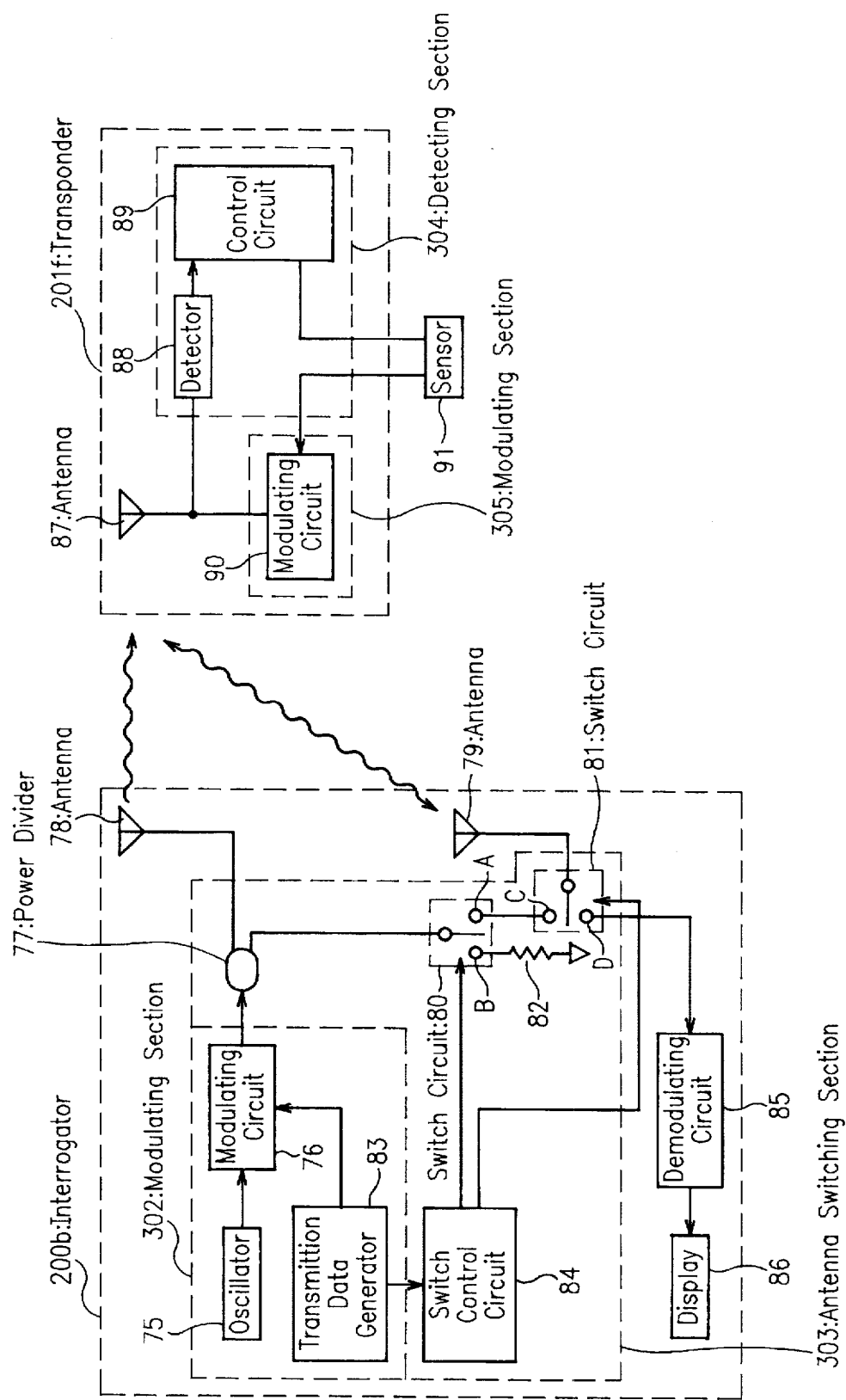
FIG. 10 is a diagram depicting a fifth illustrative wireless data acquisition equipment of the invention.

FIG. 10 shows a data acquisition equipment which resolves the foregoing problem, wherein greater details of interrogator 200b are shown comprising an oscillator 75 which generates a carrier wave, a modulating circuit 76, a power divider 77, antennas 78,79, switch circuits 80,81, a terminating resistor 82, a transmission data generator 83, a switch control circuit 84, a demodulating circuit 85, and a display 86. Also, transponder 201f comprises an antenna 87, a detector 88, a control circuit 89, a modulating circuit 90, and a sensor 91 connected to an external input terminal.

Components 75–86 comprise interrogator 200b, components 87–90 comprise transponder 201f, components 75,76, 83 comprise modulating section 302, components 77,80,81, 82 and 84 comprise antenna switching section 303, components 88 and 89 comprise detecting section 304, and component 90 comprises modulating section 305, respectively.

In interrogator 800b, the output terminal of oscillator 75 is connected to one input terminal of modulating circuit 76 and the output terminal of modulating circuit 76 is connected to power divider 77. One output terminal of power divider 77 is connected to antenna 78 and the other output terminal is connected to the input terminal of switch circuit 80. The output terminal of transmission data generator 83 is connected to the other input terminal of modulating circuit 76. One output terminal of switch circuit 80 is connected to the input terminal of switch circuit 81, and the other output terminal of switch circuit 80 is connected to one end of terminating resistor 82 whose other end is grounded. The input/output or common terminal of switch circuit 81 is connected to antenna 79. The output terminal of switch circuit 81 is connected to demodulating circuit 85 and the output terminal of demodulating circuit 85 is connected to display 86. The output terminal of transmission data generator 83 is connected to switch control circuit 84 and the output terminals of switch control circuit 84 are connected to each control terminal of switch circuits 80,81.

In transponder 201f, the output termial of antenna 87 is connected to detector 88 and the output terminal of detector 88 is connected to control circuit 89. The output terminal of control circuit 89 is connected to externally connected sensor 91. The output terminal of sensor 91 is connected to modulating circuit 90 and the output terminal of modulating circuit 90 is connected to antenna 87.

The operation of the embodiment of FIG. 10 is as follows. In interrogator 200b, switch control circuit 84 distinguishes data transmission at the time of data transmission based on a control signal from generator 83, and switches circuit 80 to the "A" side, shown in FIG. 10, and also switches circuit 81 to the "C" side, shown in FIG. 10, respectively.

Modulating circuit 76 modulates the output signal which may be from oscillator 75, using ASK modulation based on the output data from generator 83 and transmits the sigal from antenna 78 via power divider 77, as interrogation waves. Since the output of power divider 77 is also outputted to antenna 79 via switch circuits 80,81, ASK modulated interrogation waves are also transmitted simultaneously from antenna 79.

When a series of data transmissions are completed, interrogator 200b enters into a data receiving state. In the data receiving state, switch control circuit 84 determines that the data transmission is over based on a control signal from generator 83 and switches circuit 80 to the "B" side (shown in FIG. 10), and circuit 81 to the "D" side, FIG. 10.

In the data receiving state, modulating circuit 76 transmits an output signal, which may be a carrier, produced by oscillator 75, directly as unmodulated interrogation waves via power divider 77. In this case, antenna 79 does not transmit interrogation waves because antenna 79 is used for reception.

Transponder 201f receives ASK modulated interrogation waves transmitted from interrogator 200b with antenna 87 and after detecting the waves with detector 88, outputs the detected waves to control circuit 89. Control circuit 89 interprets the contents of the data transmitted from interrogator 200b and processes the data corresponding to the contents. For example, if the data content is a command to read data from externally connected sensor 91, control circuit 89 outputs a control signal to sensor 91. Sensor 91 outputs measured data to modulating circuit 90 based on the control signal from control circuit 89. Modulating circuit 90 modulates the unmodulated interrogation waves transmitted from interrogator 200b using BPSK modulation based on the output data from sensor 91 and reflects the waves back to interrogator 200b as response waves.

Interrogator 200b receives the BPSK modulated response waves reflected from transponder 201f and inputs the waves to demodulating circuit 89. Demodulating circuit 89 demodulates the BPSK modulated response waves and supplies the waves to display 86, which indicates input data or the like. As a result, the antenna gain increases by operating antennas 78 and 79 as array antennas by switching antenna 79 to a transmission mode using antenna switching section 303 in data transmission in which distance is a problem and in which the transmission distance of ASK modulated interrogation waves from the interrogator 200b is lengthened. That is, if equivalent scale antennas are used, the transmission distance is extended. On the other hand, if the antennas are small, the transmission distance for the interrogation waves can be maintained. Furthermore, since no circulator is necessary, the cost is decreased. In this connection, the wiring lengths from power divider 77 to each antenna 78 and 79 are the same, and antenna 78 and 79 are excited using an in phase signal. In general, using two array antennas improves the gain by 3 dB as compared with one antenna.

In the data receiving state, an unmodulated carrier transmitted as interrogation waves is not affected by reflection at switch circuit 80, or the like, by terminating the other output of power divider 77 with terminating resistor 82. That is, since the response waves demodulated with demodulating circuit 85 are the BPSK modulated carrier, demodulation sensitivity of demodulating circuit 85 becomes high and a suitable C/N(carrier note) can be obtained even if antenna 78, 79 , whose antenna gain are low, are used for transmission and reception, independently of each other.

In addition, although in the embodiment of FIG. 10, two antennas 78 and 79 are provided in interrogator 200b, antennas 78 and 79 per se may be configured as an array antenna. In other words, it is sufficient for the receiving antenna to be able to be switched to the transmitting antenna when data are transmitted. Although the other output terminal of circuit 81 is terminated with resistor 82, this terminal may be grounded via a capacitor. In that case, the wiring length between divider 77 and circuit 80 must be ¼ of the carrier wavelength to suppress reflection. The FIG. 10 embodiment may be used for a moving body identification system and is not limited to wireless data acquisition equipment. Although antennas 78,79 are excited in phase, it is not so limited. Moreover, the equipment can be reduced in size by use of the switching section to switch the receiving antenna to a transmitting antenna, and by operating two antennas as an array antenna, thereby enabling the maintenance of distance of interrogation waves.

Since the transponder is generally provided with a battery as a power supply, its operation is limited by the amount of energy stored therein, and such energy is dissipated as the operating time of the device elapses. Usually, it is difficult to determine when the battery will be dissipated and to replace such battery at a predetermined time so as to prevent inoperative times for the equipment.

Figure 11:
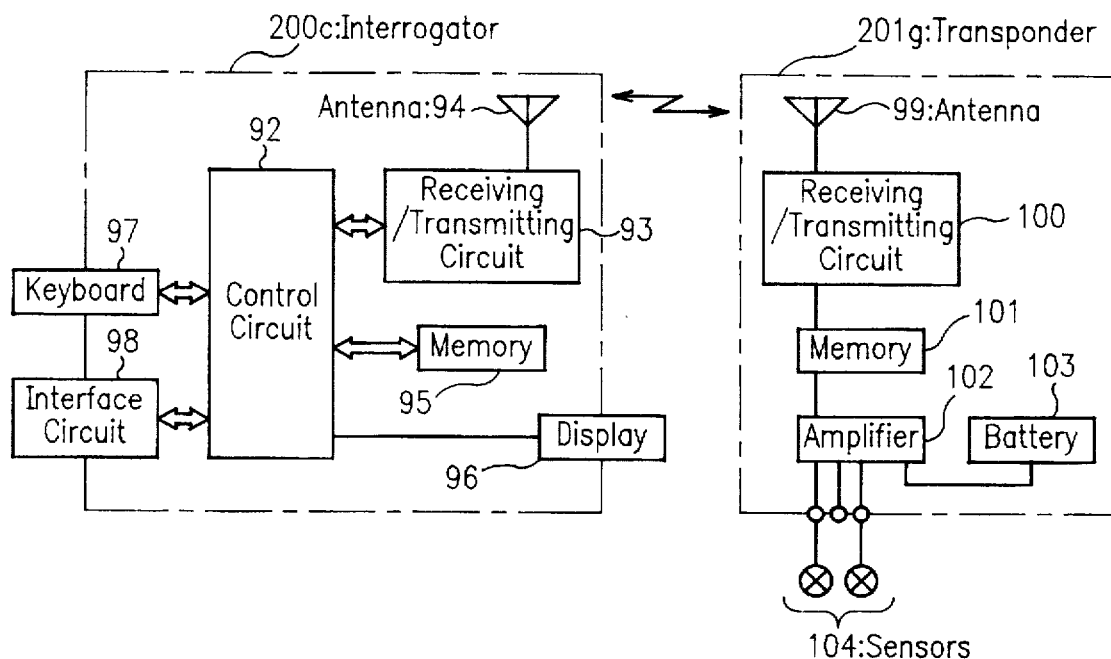
FIG. 11 is a diagram depicting a second illustrative wireless equipment diagnosis system of the invention.

FIG. 11 shows a wireless diagnosis system which resolves the foregoing difficulty, wherein interrogator 200c and transponder 201g are shown comprising a control circuit 92, receiving/transmitting circuits 93,100, antennas 94,99, memories 95,101, a display 96, a keyboard 97, an interface circuit 98, an amplifier 102, a battery 103, and sensors 104. Components 92–98 comprise interrogator 200c, and components 99 –103 comprises transponder 201g, respectively.

In interrogator 200c, the input/output terminal of antenna 94 is connected to receiving/transmitting circuit 93, and the input/output terminal of receiving/transmittin circuit 93 is connected to control circuit 92. Memory 95, display 96, keyboard 97, and interface 98 are connected to control circuit 92.

The output terminal of sensors 104 and the output terminal of battery 103 are connected to each input terminal of amplifier 102 and the output terminal of amplifier 102 is connected to receiving/transmitting circuit 100 via memory 101. The input/output terminal of input/output terminal of receiving/transmitting circuit 100 is connected to antenna 99.

The operation of the embodiment of FIG. 11 is as follows. Sensors 104 are mounted on equipment being diagnosed and measure physical quantities for judging failure or deterioration in the equipment, e.g. temperature, vibration, pressure, strain, etc. The measured data are inputted to amplifier 102 and the output voltage of battery 103 is also inputted to amplifier 102. Amplifier 102 obtains the measured data and output voltage and A/D converts same, and the data are then stored in memory 101. The stored measured data are read according to a reading request from interrogator 200c, and in a wireless communication manner are transmitted to interrogator 200c. When the reading request is received, amplifier 102 obtains measured data by implementing A/D conversion and data are transmitted directly to interrogator 200c without first storing the data in memory 101. In memory 101, instrument information, such as equipment number, location, etc, transmitted from interrogator 200c is recorded and if desired transmitted to interrogator 200c. In addition, transponder 201g stores time data obtained from a clock , not shown, in memory 101, or transmits the time data directly to interrogator 200c together with the measured data.

On the other hand, interrogator 200c is carried by an operator and a wireless signal from transponder 201g is received with antenna 94, demodulated by receiving/transmitting circuit 93 and received in control circuit 92. Measured data, and the like; received in control circuit 92 are stored in memory 95 or displayed in display 96. In this case, the output voltage of battery 103 is also displayed. As a result, since the output voltage of battery 102 is displayed in interrogator 200c at the same time, a dissipated condition in the power supply in transponder 201g can be read in interrogator 200c.

Figure 12:
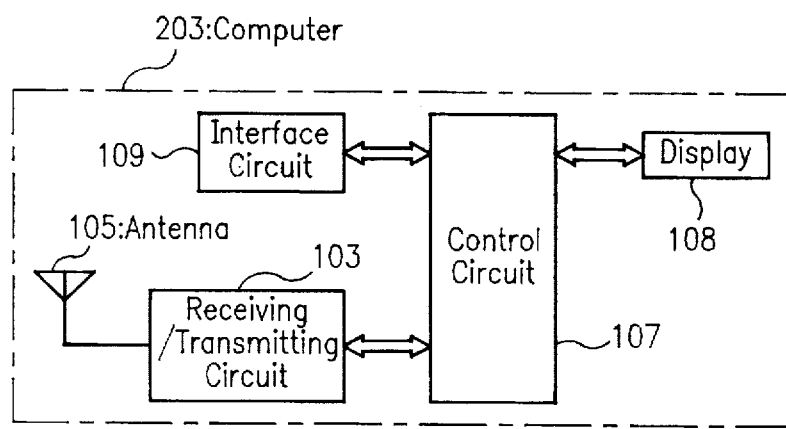
FIG. 12 is a diagram depicting an illustrative host computer of the invention.

FIG. 12 shows a host computer used in the invention, wherein computer 203 comprises an antenna 105, a receiving/transmitting circuit 106, a control circuit 107, a display 108, and an interface circuit 109. Components 105–109 comprise the host computer 203. Receiving/transmitting circuit 106, display 108, and interface circuit 109 are connected respectively to control circuit 107. The input/output terminal of receiving/transmitting circuit 106 is connected to antenna 105.

Operation of the computer 203 of FIG. 12 is as follows. Host computer 203 obtains data from interrogator 200c in a wireless manner or via a RS232-C interface. For example, if wireless communication is used, host computer 203 has interrogator 200c transmit the measured data from its antenna 94, receives the data with antenna 105, demodulates the data with receiving/transmitting circuit 106, and receives data in control circuit 107. As a result, since the output voltage of battery 103 is displayed together with the measured data in host computer 103, the dissipated condition of the power supply in transponder 201g can be readily determined.

In addition, if the lower value of the battery output is set in adance in transponder 201g, interrogator 200c, or host computer 203, an alarm indicator,or the like, can be set by judging that the battery 103 has dissipated when the voltage falls below that lower limit. Since the output voltage of battery 103 changes depending on ambient temperature, if the lower limit is to be accurately set, it is necessary to consider the output voltage variation depending on ambient temperature changes, and this may result in large variation from the set limit than required. Accordingly, by providing a temperature sensor that measures ambient temperature of transponder 201g as one of the sensors 104 and compensating for the battery voltage according to the ambient temperature sensor, the dissipated condition of the battery in transponder 201g can be more accurately determined. Temperature compensation may be performed by a device in higher-level interrogator 200c by transmitting the ambient temperature data together with the other measurement data to higher level interrogator 200c.

The output voltage change in battery 103 progresses almost constantly in steady state and the voltage changes steeply just before complete dissipation. This makes determination of the replacement time for battery 103 visually possible, or by using control circuit 92 or 107, by displaying the change of output voltage of battery 103 with the time in a graph interrogator 200c or in host computer 203. Power consumption in transponder 201g can be reduced by reflecting the transmitted waves from interrogator 200c after modulation, back to interrogator 200c. Consumption cannot be reduced by transmitting wireless signals from transponder alone, but, can be reduced when transponder 201g receives the transmitted waves from interrogator 200c and reflects same back to the interrogator 200c.

Advantageously, the FIG. 11 and FIG. 12 embodiments enable the condition of the power supply in transponder to be readily determined by transmitting information of the power supply state together with measurement data to the interrogator 200c. Also, by setting a lower limit value of battery voltage in advance in the transponder 201g, interrogator 200c, or host computer 203, the battery voltage and hence dissipated status can be indicated together with an alarm when the voltage falls below such limit.

Also, the dissipated condition of the battery of transponder 201g can be more accurately determined by providing a temperature sensor which measures ambient temperature of transponder 201g, and by transmitting an output signal of that temperature sensor together with measured data , or by compensating the power supply voltage based on the output of the temperature sensor.

In addition, interrogator 200c or host computer 203 can determine when a battery needs replacement by visual inspection of a graph displaying the dissipation status of the battery as measured against time. Furthermore, power consumption in transponder 201g can be reduced by reflecting the transmitted waves,from interrogator 200c after modulating the waves, back to interrogator 200c.

If measured data acquired by interrogator 200 or 200c, in the system of FIG. 1 or FIG. 11, are to be transferred to a host computer, the data may be transferred via an interface circuit. Data transfer maybe provided using an RS232-C interface or Infrared Data Association (IrDA) standard using wired or optical communication. However, these transfer methods involve a problem in that where the scale of the circuit becomes large and the cost thereof increases, since using RS232-C interfaces,or the like, requires an integrated circuit for a line driver conforming to their standards, or if the IrDA standard is used, an integrated circuit dedicated to modulation-demodulation is needed. Moreover, there is also the problem that if an interrogator is intended to conform to the standards for intrinsic safety, conformity is difficult to realize because a booster circuit is incorporated in the line driver of the RS232-C serial communication.

Figure 13:
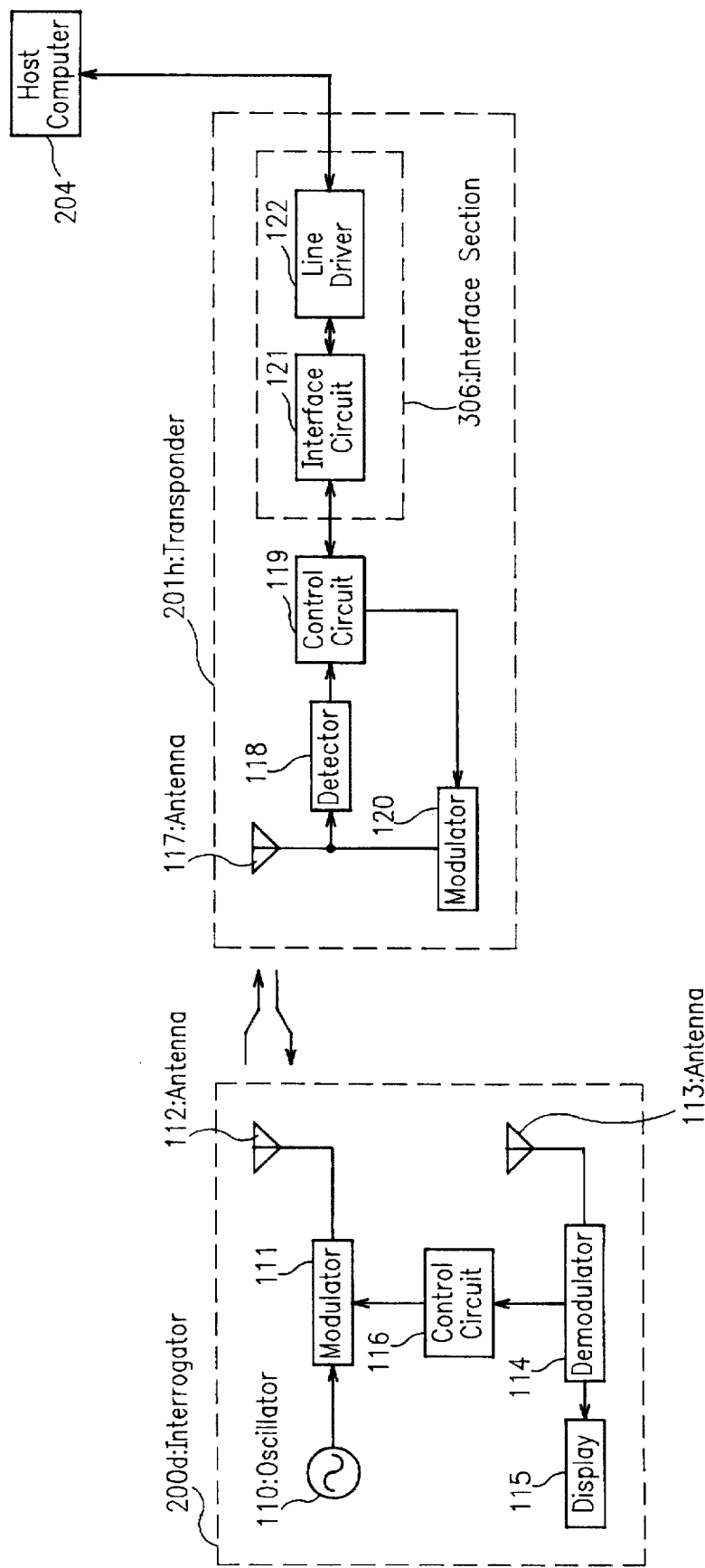
FIG. 13 is a diagram depicting a sixth illustrative wireless data acquisition equipment of the invention.

FIG. 13 shows a wireless data acquisition equipment which solves the foregoing problems, wherein interrogator 200d, and transponder 201h comprise an oscillator 110, modulators 111,120, antennas 112,113 and 117, a demodulator 114, a display 115, control circuits 116, 119, a detector 118, an interface circuit 121, a line driver 122. Also depicted is host computer 204. Components 110–116 comprise interrogator 200d, and components 117–122 comprise transponder 201h with an interface with host computer 204. (hereinafter called IF transponder). Components 121 and 122 comprise interface section 306.

In interrogator 200d, oscillator 110 is connected to modulator 111 and the output terminal of modulator 111 is connected to antenna 112. To the control terminal of modulator 111, a control signal is supplied from control circuit 116. The output terminal of antenna 113 is connected to demodulator 114 and the output terminals of demodulator 114 are connected to display 115 and control circuit 116, respectively In IF transponder 201h the output terminal of antenna 117 is connected to detector 118 and the output terminal of detect or 118 is connected to control circuit 119. The output terminal of control circuit 119 is connected to modulator 120 and interface circuit 121, and the output terminal of modulator 120 is connected to antenna 117. The output terminal of interface circuit 121 is connected to host computer 204 via line driver 122.

Operation of the embodiment of FIG. 13 is as follows. Interrogator 200d implements amplitude modulation on an output signal from oscillator 110 using modulator 111 and transmits the modulated waves to the IF transponder 201h as interrogation waves. IF transponder 201h receives the interrogation waves with antenna 117, detects the waves with detector 118, and outputs the waves to control circuit 119. Control circuit 119 converts the data transmitted from interrogator 200d to a data format conforming to any suitable communication standard in interface 121 and transfers the data to host computer 204 via line driver 122. As a result, the interface function in interrogator 200d becomes unnecesssary. Thus, interrogator 200d can be made smaller, and cost thereof can be reduced. The interface function can be provided in the host computer or in the IF transponder 201h.

Advantageously, with this embodiment it is easier to conform to applicable safety standards since the interface function can be performed outside of the interrogator. Although, only uploading of host computer 204 is discussed, downloading is also possible. That is to say, data from host computer 204 is inputted to interface circuit 121 via line driver 122, and after data conversion, the data are outputted to control circuit 119. Control circuit 119 then drives modulator 120 based on the data to thereby transmit to interrogator 200d, the response waves generated by the same technique described in earlier embodiments. Interrogator 200*d* receives the BPSK modulated response waves from IF transponder 201*h* with antenna 113 and completes downloading by demodulating the contents of the response wave using demodulator 114.

Although in the foregoing, communication is by wireless means. Other types of communication can be used, such as optical communication, as well as those conforming to the Ir DA standard. Moreover, the interface of host computer 204 is not limited to serial communication, but, may be used with parallel I/O communication, and the like.

Advantageously, the FIG. 13 embodiment employs an interface function with host computer 204 in transponder 201*h*. Hence, wireless communication between interrogator 200*d* and host computer 204 is realized.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A wireless equipment diagnosis system comprising:

interrogation means for transmitting interrogation waves and for receiving back as response waves the same interrogation waves after modulation in measurement acquisition means to contain diagnosis information of said equipment being diagnosed; and said measurement acquisition means physically separated from said interrogation means and comprising means for obtaining diagnosis information of said equipment, means for receiving said interrogation waves from said interrogation means, means for modulating said interrogation waves based on said diagnosis information, and means for outputting the modulated interrogation waves as response waves for wireless transmission to said interrogation means; whereby said interrogation waves from said interrogation means are used to interrogate the measurement acquisition means and to serve as medium for obtaining diagnosis information from the measurement acquisition means thereby to improve reliability of diagnosis information retrieval.

2. The system of claim 1, wherein said interrogation means comprises means for generating interrogation waves, antenna means for transmitting said interrogation waves and for receiving said response waves, means for storing diagnosis standards, means for comparing diagnosis information received in said response waves to said diagnosis standards, and means for outputting diagnosis information based on said comparison.

3. The system of claim 1, wherein said interrogation means comprises oscillator means for generating said interrogation waves, modulation means for modulating said interrogation waves, antenna means for transmitting the modulated interrogation waves and for receiving the response waves from said measurement acquisition means, demodulator means for demodulating the response waves received by said antenna means, and means for displaying the diagnosis information from the demodulated response waves.

4. The system of claim 1, wherein said measurement acquisition means comprises:

means for receiving said interrogation waves and for transmitting back said interrogation waves after modulation with data from sensor means;

said sensor means for obtaining data of the condition of said equipment; and trigger means responsive to a trigger component of said interrogation waves for connecting said sensor means to said means for receiving and transmitting.

5. The system of claim 1, wherein said measurement acquisition means comprises:

antenna means for receiving said interrogation waves and for transmitting back said interrogation waves after modulation;

detector means for detecting said interrogation waves;

sensor means for obtaining data of equipment condition;

signal processing means for processing said interrogation waves to determine identity of a particular measurement acquisition means being accessed and for controlling application of data to a modulation means; and said modulation means for modulating said interrogation waves based on said data and for applying the modulated interrogation waves to said antenna means.

6. The system of claim 1, wherein said measurement acquisition means comprises:

antenna means for receiving said interrogation waves and for transmitting back said interrogation waves after modulation as response waves;

detector means for detecting said interrogation waves;

sensor means for sensing condition of said equipment;

memory means for storing timing signals and for storing data from said sensor means;

modulation means; and control means for taking said data from said memory means in response to signals contained in said interrogation waves and at a predetermined timing to cause said modulation means to modulate said interrogation waves based on said data from said sensor means, and then to transmit the modulated interrogation waves back to said interrogation means as response waves through said antenna means.

7. The system of claim 1, wherein said measurement acquisition means comprises:

antenna means for receiving said interrogation waves and for transmitting back said interrogation waves after modulation as response waves;

sensor means for sensing condition of said equipment and for outputting data thereof;

detection means for detecting said interrogation waves;

control means responsive to information contained in said interrogation waves for operating said sensor means;

modulation means; and signal processing means for taking data from said sensor means under control of said control means to provide processed signals to said modulation means to modulate said interrogation waves based on data from said sensor means and to cause said modulation means to output the modulated signals to the antenna means for wireless transmission to the interrogation means.

8. The system of claim 1, wherein said measurement acquisition means comprises:

antenna means for receiving said interrogation waves and for transmitting back said interrogation waves after modulation as response waves;

sensor means for sensing condition of said equipment;

detector means for detecting said interrogation waves;

modulation means; and processing means for receiving data from said sensor means and said interrogation waves from said detector means and then for providing data to said modulation means to cause modulation of said interrogation waves based on data from said sensor means indicating condition of said equipment thereby to provide response waves for transmission by said antenna means; wherein said processing means comprises: a control circuit for receiving signals from said detector means, a reference memory means for storing reference signals; a trigger circuit for providing trigger signals; and signal processing circuit means for receiving reference signals, trigger signals, and output from said sensor means, and then providing signals for operating said modulation means.

9. The system of claim 1, wherein said measurement acquisition means comprises:

antenna means for receiving said interrogation waves and for transmitting back said interrogation waves after modulation as response waves;

sensor means for sensing condition of said equipment;

detector means for detecting said interrogation waves;

modulation means; and processing means for receiving data from said sensor, means and said interrogation waves from said detector means and then for providing data to said modulation means to cause modulation of said interrogation waves based on data from said sensor means indicating condition of said equipment thereby to provide response waves for transmission by said antenna means; wherein said processing means comprises: a control circuit for receiving output from said detector means; memory means for receiving data from said sensor means, timer means, and signal processing means for receiving data from said memory means and timing signal from said timer means, and for providing signals to said modulation means.

10. The system of claim 3, wherein said measurement acquisition means comprises:

antenna means for receiving said interrogation waves and for transmitting back said interrogation waves after modulation as response waves;

detector means for detecting said interrogation waves;

sensor means for sensing condition of said equipment;

modulation means for receiving signals from said sensor means under control of a control circuit for modulating aid interrogation waves and for outputting to said antenna means; and wherein said interrogation means comprises two antennas one connected to said modulation means and the other connected to said detector means, wherein said detector means also comprises said control circuit; and switching means for switching between the two antennas and said demodulator means and modulation means.

11. The system of claim 1, wherein said measurement acquisition system comprises:

antenna means for receiving said interrogation waves and for transmitting back said response waves; sensor means ;

means for transmitting and receiving the interrogation waves;

memory means for storing data from said sensor means and data for diagnosis of said equipment; and battery means for providing timing signal.

12. A wireless data acquisition equipment comprising:

interrogator means; and one or more transponder means for receiving interrogatory signals from said interrogatory means and then transmitting to the interrogatory means the interrogatory signals after modulating the interrogatory signals using a modulator means with data measured by the one or more transponder means, said one or more transponder means comprising:

an antenna means for receiving said interrogatory signals and for transmitting the modulated interrogatory signals to said interrogatory means;

said modulator means for modulating said interrogatory signals;

detector means for detecting said interrogatory signals and for outputting a detected signal representing said interrogatory signals;

a control circuit means for receiving said output signals from said detector means and for generating control signals; and an interface section for transferring said detected control signals to a host computer, said interface section comprising line driver means for receiving data from said host computer;

an interface circuit means for outputting said received signal from said host computer; and wherein said modulator means modulates said interrogatory signals based on output from said control circuit means.

* * * * *